(12) United States Patent
Chopra et al.

(10) Patent No.: US 11,531,592 B1
(45) Date of Patent: *Dec. 20, 2022

(54) METHOD AND SYSTEM FOR DETERMINING FAVORABILITY OF UPGRADE WINDOW

(71) Applicant: EMC IP Holding Company LLC, Hopkinton, MA (US)

(72) Inventors: Shelesh Chopra, Bangalore (IN); Hemant Ramesh Gaikwad, Bangalore (IN); Rahul Deo Vishwakarma, Kolkata (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,439

(22) Filed: Jul. 27, 2021

(30) Foreign Application Priority Data

Jun. 22, 2021 (IN) .............................. 202141026168

(51) Int. Cl.
| | |
|---|---|
| *G06F 11/14* | (2006.01) |
| *G06F 8/71* | (2018.01) |
| *G06F 8/65* | (2018.01) |
| *G06F 11/34* | (2006.01) |
| *G06F 11/00* | (2006.01) |

(52) U.S. Cl.
CPC ............ *G06F 11/1433* (2013.01); *G06F 8/65* (2013.01); *G06F 8/71* (2013.01); *G06F 11/008* (2013.01); *G06F 11/1451* (2013.01); *G06F 11/3409* (2013.01)

(58) Field of Classification Search
None
See application file for complete search history.

(56) References Cited

U.S. PATENT DOCUMENTS

| | | |
|---|---|---|
| 9,323,644 B1 | 4/2016 | Hale et al. |
| 9,383,989 B1 | 7/2016 | Qi et al. |

(Continued)

OTHER PUBLICATIONS

Liu et al., "zUpdate: Updating Data Center Networks with Zero Loss", 2013, pp. 411-422, [Retrieved from Internet on Sep. 14, 2022].

(Continued)

*Primary Examiner* — Marina Lee
(74) *Attorney, Agent, or Firm* — Chamberlain, Hrdlicka, White, Williams & Aughtry

(57) ABSTRACT

Techniques described herein relate to a method for deploying workflows with data management services. The method may include identifying a service update event; identifying a service sub-tree based on a service call graph; generating an update sequence for the service sub-tree; predicting an update window for the service sub-tree using a final estimated updated completion time for the service, wherein the final estimated updated completion time is based on a risk profile; selecting a first service of the service sub-tree based on the update sequence, wherein the first service includes a first standby service instance and a first active service instance; generating a backup of a first portion of a services shared data volume repository associated with the first service; and applying an update to the first standby service instance to obtain a first updated active service instance.

20 Claims, 13 Drawing Sheets

(56) References Cited

U.S. PATENT DOCUMENTS

| | | | |
|---|---|---|---|
| 10,089,585 B1 | 10/2018 | Alexander | |
| 10,817,279 B1* | 10/2020 | Wang | H04L 67/34 |
| 11,074,064 B1* | 7/2021 | Hm | G06N 3/088 |
| 11,113,771 B1 | 9/2021 | Wang et al. | |
| 11,144,438 B1 | 10/2021 | Teixeira | |
| 11,330,078 B1* | 5/2022 | Chopra | H04L 67/60 |
| 2004/0078778 A1 | 4/2004 | Leymann et al. | |
| 2008/0134145 A1* | 6/2008 | Halcrow | G06F 8/65 |
| | | | 717/124 |
| 2012/0259813 A1 | 10/2012 | Takata et al. | |
| 2014/0013318 A1 | 1/2014 | Rychikhin | |
| 2014/0359051 A1 | 12/2014 | Dart et al. | |
| 2016/0162819 A1 | 6/2016 | Hakman et al. | |
| 2019/0026097 A1 | 1/2019 | Jebbar et al. | |
| 2019/0362354 A1* | 11/2019 | Zaslavsky | G06Q 20/4016 |
| 2020/0057625 A1 | 2/2020 | Livne et al. | |
| 2020/0174769 A1* | 6/2020 | Zolotow | G06F 8/65 |
| 2020/0249928 A1 | 8/2020 | Zeng et al. | |
| 2020/0278855 A1 | 9/2020 | Nidugala et al. | |
| 2020/0334026 A1 | 10/2020 | Wang et al. | |
| 2021/0049003 A1* | 2/2021 | Trahan | G06F 8/73 |
| 2021/0133076 A1* | 5/2021 | Su | H04L 43/0858 |
| 2021/0294800 A1 | 9/2021 | Vishwakarma et al. | |
| 2022/0091838 A1 | 3/2022 | Lee et al. | |
| 2022/0156053 A1 | 5/2022 | Shaastry et al. | |

OTHER PUBLICATIONS

Tsai et al., "Enabling Efficient and Consistent Network Update in Wireless Data Centers", 2019, pp. 505-520, [Retrieved from Internet on Aug. 25, 2022].

Simha et al, "An Update-Aware Storage System for Low-Locality Update-Intensive Workloads", 2012, [Online], pp. 375-386, <https://dl.acm.org/doi/pdf/10.1145/2189750.2151016> (Year: 2012).

* cited by examiner

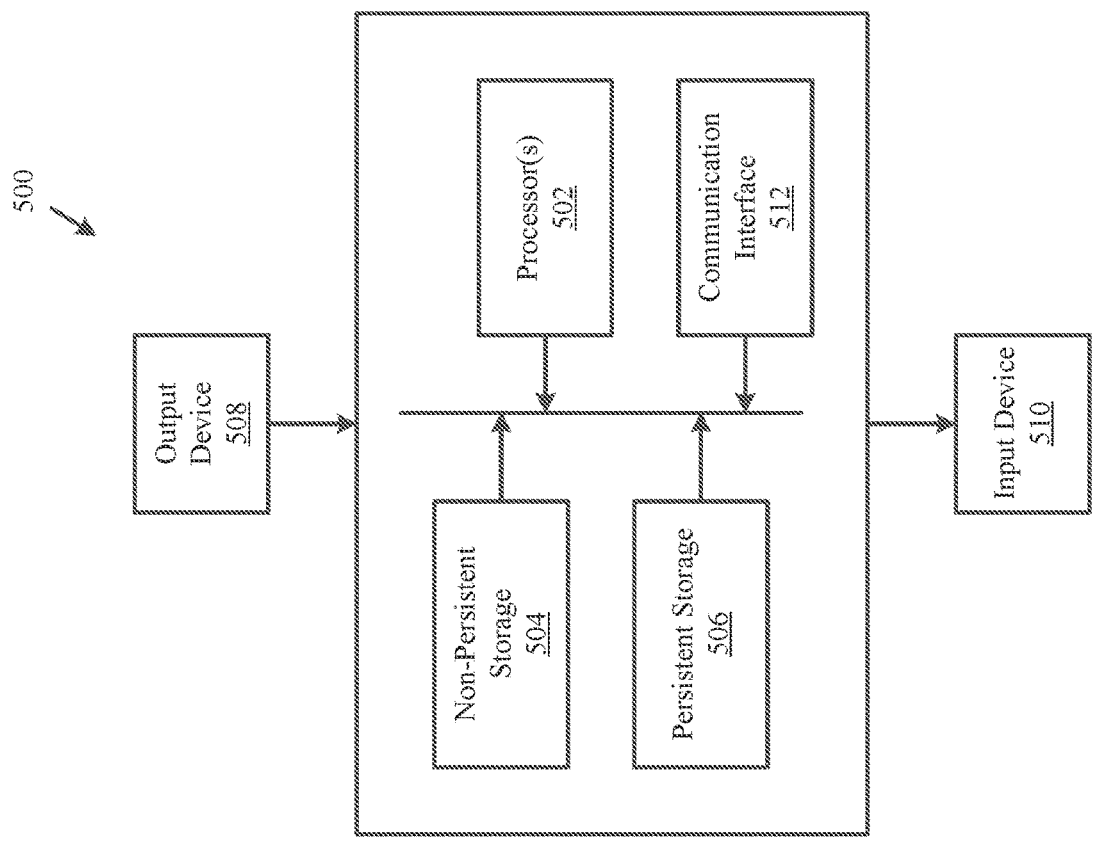

METHOD AND SYSTEM FOR DETERMINING FAVORABILITY OF UPGRADE WINDOW

BACKGROUND

Computing devices may provide services. To provide the services, the computing devices may include hardware components and software components. The software components may be updated to improve the performance of the aforementioned services. The performance of the services may be important to users and/or other computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5 shows a diagram of a computing device in accordance with one or more embodiments of the invention.

DETAILED DESCRIPTION

Figure 1A:
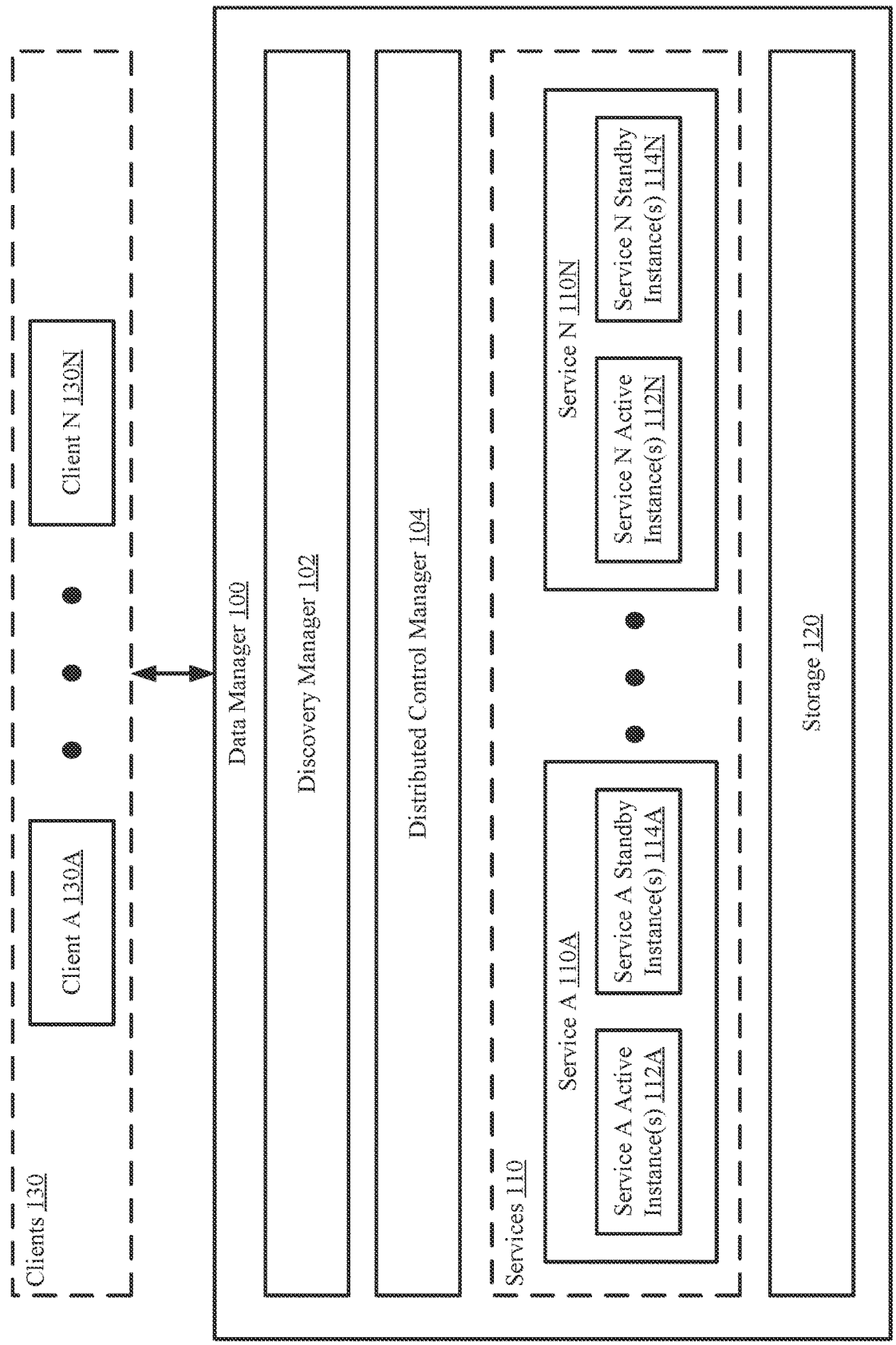
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for managing the update of a data manager that includes services. More specifically, embodiments of the invention relate to identifying service sub-tree that includes a uniquely dependent portion of the services, predicting an update window to perform the update of the services in the service sub-tree, and applying the update to the services of the service sub-tree. Further, the update may be applied based on an update sequence which may specify an order of service sub-trees and services to update. A service may include at least one active service instance and at least one standby service instance. A service may be updated by updating the standby service instance, switching the updated standby service instance to an updated active service instance, and switching the previously active service instance to a standby service instance. As a result, the updated active service instance may begin to service requests.

A performance and reliability check may be performed on the updated active service instance to ensure that the performance of the updated active service instance is satisfactory. The previously active standby service instance may be updated if the performance of the updated active service instance is satisfactory. The update to the updated active service instance may be reversed, the previously active standby instance may be switched to an active instance, and the previously updated active instance may be switched to a standby instance if the performance of the updated active service instance is not satisfactory. As a result, the data manager may be updated in a manner that minimizes downtime of services thereby reducing the impact of updates to data manager performance.

In one or more embodiments of the invention, predicting the update window to perform the update of the services takes into account a risk profile of the services. In this context, the risk profile is used to quantify the likelihood that a given update of a service will be successful. If the risk profile indicates that there is likelihood that the update will not be successful, then the prediction of the update window for the service may mitigate the risk of an unsuccessful update by requiring a larger window during which the service may be updated. In this manner, a more realistic amount of time is allocated for performing the update of a service. The larger window (i.e. period of time) may be implemented by the addition of a buffer window. The size of the buffer window may be specified as function of the risk level specified in the risk profile and the average time (based on historical data) to update the service (e.g., buffer window=f (risk level, estimated update completion time). The function may be a linear function, a geometric function, or any other type of function. Accordingly, by taking into account the risk profile the service, the estimated time to update a given service (also referred to as the final estimated update completion time) may be specified using the following expression: final estimated update completion time=estimated update completion time+buffer window.

FIG. 1A shows a diagram of a system in accordance with one or more embodiments of the invention. The system may include a data manager (100) and clients (130). The system may include other and/or additional components without departing from the invention.

In one or more embodiments of the invention, the data manager (100) includes the functionality to perform management services for the clients (130). As a result, the clients (130) may send requests to the data manager to perform the management services. The requests may include requests to read data, requests to write data, requests to fetch data, requests to modify data, requests to move data, requests to delete data, and/or other and/or additional types of requests without departing from the invention. The data manager (100) may include other and/or additional functionalities without departing from the invention.

In one or more embodiments of the invention, the data manager (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data manager (100) described throughout this application.

In one or more embodiments of the invention, the data manager (100) is implemented as a logical device. The logical device may utilize the computing resources of any number of computing devices and thereby provide the functionality of the data manager (100) described throughout this application.

As discussed above, the management services performed by the data manager may include servicing requests. The management services of the data manager may be separated into each individual service of the management services. The services (110) of the management services may include, for example, discovery services, inventory services, monitoring services, and other and/or additional types of management services without departing from the invention. A service may perform all and/or a portion of a request. The requests may be external requests (e.g., requests obtained from clients (130)) and/or internal requests (e.g., requests obtained from one service of the data manager (100) and serviced by another service of the data manager (100)). Each service may include at least one active instance and at least one standby instance. Accordingly, service A (110A) may include a service A active instance(s) (112A) and a service A standby instance(s) (114A), and service N (110N) may include a service N active instance(s) (112N) and a service N standby instance(s) (114N). The active instances may perform the requests directed at the associated service while the standby request may not perform the request directed at the associated service. The services (110) may be implemented as computer instructions, e.g., computer code, stored on a storage (e.g., 120) that when executed by a processor(s) of the data manager (100) cause the data manager (100) to provide the functionality of the services (100) described throughout this application. The data manager (100) may be updated and, as a result, each service may be updated.

The data manager (100) may include a discovery manager (102). The discovery manager (102) may include the functionality to manage service change events as discussed in FIG. 3A. As a result of the aforementioned functionality, the discovery manager (102) may generate, update, and/or maintain a service routing table (discussed below). The discovery manager (102) may include other and/or additional functionalities without departing from the invention.

In one or more embodiments of the invention, the discovery manager (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the discovery manager (102) described throughout this application.

In one or more embodiments of the invention, the discovery manager (102) is implemented as computer instructions, e.g., computer code, stored on a persistent storage that when executed by a processor of the data manager (100) causes the data manager (100) to provide the functionality of the discovery manager (102) described throughout this application.

The data manager (100) may include a distributed control manager (104). The distributed control manager (104) may include the functionality to manage updates of the data manager (100) as discussed in FIGS. 3B-3D. The distributed control manager (104) may include other and/or additional functionalities without departing from the invention.

In one or more embodiments of the invention, the distributed control manager (104) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the distributed control manager (104) described throughout this application.

In one or more embodiments of the invention, the distributed control manager (104) is implemented as computer instructions, e.g., computer code, stored on a persistent storage that when executed by a processor of the data manager (100) causes the data manager (100) to provide the functionality of the distributed control manager (104) described throughout this application.

In one or more embodiments of the invention, the storage (120) may store data and metadata that may be used by the distributed control manager (104, FIG. 1A) to perform updates of the services of the data manager (100, FIG. 1A) and by the services (110) of the data manager (100) to perform requests. The storage may be implemented using any combination of volatile and non-volatile (i.e., persistent) storage.

In one or more embodiments of the invention, the clients (130) utilize management services provided by the data manager (100). The clients (130) may include any number of clients such as client A (130A) and client N (130N).

In one or more embodiments of the invention, a client of the clients (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the clients (130) described throughout this application.

In one or more embodiments of the invention, the clients (130) are implemented as a logical device. The logical device may utilize the computing resources of any number of computing devices and thereby provide the functionality of the clients (130) described throughout this application.

Figure 1B:
FIG. 1B shows a diagram of a storage in accordance with one or more embodiments of the invention.

FIG. 1B shows a diagram of a storage in accordance with one or more embodiments of the invention. The storage may be an embodiment of the storage (120, FIG. 1A) discussed above. As discussed above, the storage (120) may store data and metadata that may be used by the distributed control manager (104, FIG. 1A) to perform updates of the services of the data manager (100, FIG. 1A) and by the services (110) of the data manager (100) to perform requests. The storage (120) include a service metadata repository (122), a requests and performance metrics information repository (124), and a services shared data volumes repository (126). The storage (120) may include other and/or additional data and/or metadata without departing from the invention. Each of the aforementioned components of the storage (120) is discussed below.

In one or more embodiments of the invention, the service metadata repository includes information associated with services and may be used by the distributed control manager (104, FIG. 1A) to perform updates of the services of the data manager (100, FIG. 1A) and by the services (110) of the data manager (100) to perform requests. For additional information regarding the service metadata repository (122), refer to FIG. 2.

The requests and performance metrics information repository (124) may include one or more data structures that include requests and performance metrics information associated with each service of the services (110A) of the data manager (100, FIG. 1A). The requests and performance metrics information may include time series data (i.e., when a request was initiated and when it was completed) associated with each request performed by the services of the data manager and each service instance of the services of the data manager (100, FIG., 1A).

The requests and performance metrics information may also include service update status information for each service. The service status update information may include, but it not limited to, a count of a total number of times that an attempt was made to update the service (from the time it was instantiated until present), a count of a total number of times that an attempted update of the service failed, and a count of a total number of times that an attempted update of the service resulted in an update roll-back (i.e., scenarios in which the update was completed, i.e., the updating of the service did not fail but the update needs to be undone (i.e., rolled back) because, for example the updated service is experiencing a performance degradation, is incompatible with other services, etc.).

The time series data and service update status information may be generated using monitoring information associated with each request and each service instance obtained from the distributed control manager (104, FIG. 1A) and/or clients (130, FIG. 1A). The time series data and service update status information may be used to determine the response completion times and service throughput for each request. Additionally, the time series data and service update status information may be used to predict and update window for a service sub-tree. Additionally, the requests and performance metrics information may include performance metrics associated with each service. The performance metrics may include, for example, central processing unit (CPU) utilization, memory utilization, and IO performance information associated with the performance of requests. The performance metrics may be used in combination with the time series data to maintain a historical record of the performances of requests by the services. This historical record may be used in comparison with the requests and performance metrics information associated with the performance of post-update requests to perform performance and reliability checks on updated service instances to determine whether updated service instances are optimally performing requests. The requests and performance metrics information repository (124) may include other and/or additional information without departing from the invention.

The services shared data volumes repository (126) may include one or more data structures that include data used by and/or associated with each service. Each service may be associated with a portion of the services share data volumes repository (126). Each service, including all its instances, may store the data associated with the service in the portion of the services shared data volumes repository (126), which is provisioned for each service. The shared volume per service may provide data isolation among various services, making each service self-contained. The data associated with each service may be used to restore updated service instances to previous versions. The services shared data volumes repository (126) may include other and/or additional data and may be used by other and/or additional purposes without departing from the invention.

Figure 2:
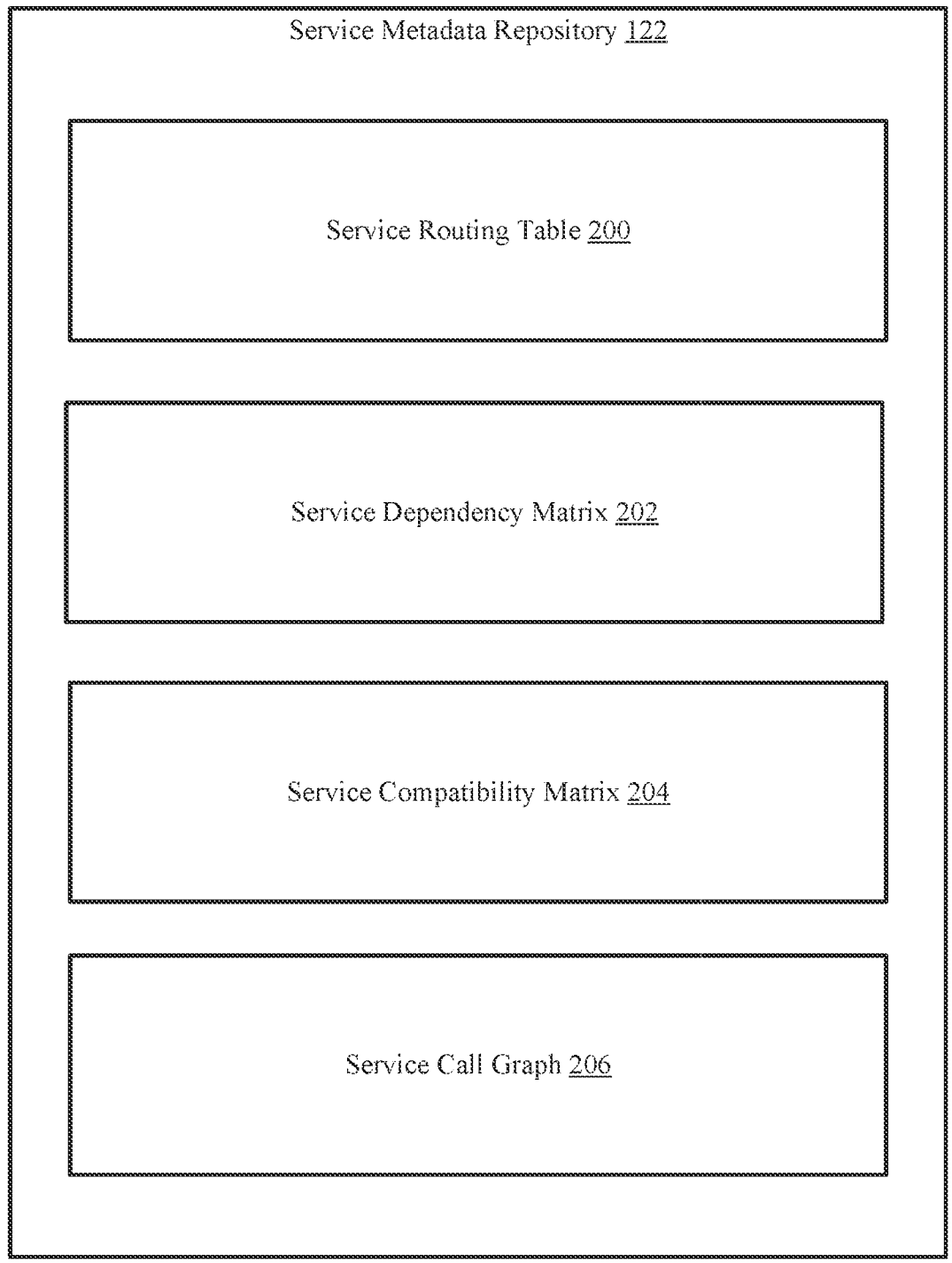
FIG. 2 shows a diagram of a service metadata repository in accordance with one or more embodiments of the invention.

FIG. 2 shows a diagram of a service metadata repository in accordance with one or more embodiments of the invention. The service metadata repository may be an embodiment of the service metadata repository (122, FIG. 1B) discussed above. As discussed above, the service metadata repository (122) may include information associated with services and may be used by the distributed control manager (104, FIG. 1A) to perform updates of the services of the data manager (100, FIG. 1A) and by the services (110) of the data manager (100) to perform requests. The service metadata repository (122) may be generated maintained by the discovery manager (102, FIG. 1A) and the distributed control manager (104, FIG. 1A). The service metadata repository (122) may include a service routing table (200), a service dependency matrix (202), a service compatibility matrix (204), and a service call graph (206). The service metadata repository may include other and/or additional information without departing from the invention. Each of the aforementioned components of the service metadata repository (122) is discussed below.

The service routing table (200) may be one or more data structures that includes service information associated with each service (e.g., 110A, FIG. 1A) of the data manager (100, FIG. 1A). The service information may include a service identifier, service version, host identifier associated with the service, an endpoint uniform resource locator (URL) address and/or a port number associated with service instances of the services, a status that depicts whether the service is currently running, instance identifiers, and activity flags that denote whether instances are active instances or standby instances. The service information may include other and/or additional information without departing from the invention. The service routing table (200) may be maintained by the discovery manager (102, FIG. 1A) during a service change event and by the distributed control manager (104, FIG. 1A) during an update of the data manager (100, FIG. 1A). The service routing table (200) may be used by services (110, FIG. 1A) and/or clients (130, FIG. 1A) to perform requests. The service routing table (200) may include other and/or additional types of information and may be used for other and/or additional purposes without departing from the invention.

The service dependency matrix (202) may be one or more data structures that include service dependency information. The service dependency information may specify, for each service, which other services that service is dependent upon to perform requests. The service dependency information may relate service identifiers to denote the service dependencies. The service dependency information may include other and/or additional information without departing from the invention. The service dependency matrix (202) may be used to generate the service call graph (206). The service dependency matrix (202) may be generated manufactures recommendation of dependencies and/or using requests and performance metrics information included in the requests and performance metrics information repository (124) (discussed above). The service dependency matrix (202) may include other and/or additional types of information without departing from the invention.

The service compatibility matrix (204) may be one or more data structures that include service compatibility information. The service compatibility information may include service identifiers and service versions for each service. The service compatibility information may also specify the versions of services in which each service is compatible with. In other words, the service compatibility information specifies which versions of the dependent services a particular service may use to perform requests. The service compatibility information may be generated using manufactures recommendation of compatibilities and/or using requests and performance metrics information included in the requests and performance metrics information repository (124) (discussed above). The service compatibility information may include other and/or additional information without departing from the invention. The service compatibility matrix (204) may include other and/or additional types of information without departing from the invention.

The service call graph (206) may be one or more data structures that include service hierarchical information. The service hierarchical information may specify a hierarchical relationship of dependencies between the services of the data manager (100, FIG. 1A). The service hierarchical information may include service identifiers. The service call graph (206) may be used to identify service sub-trees. Service sub-trees may be a unique portion of dependent services in the services call graph (206) that do not share services with other service sub-trees. The service hierarchical information may include other and/or additional information without departing from the invention. The service call graph (206) may include other and/or additional types of information without departing from the invention.

Figure 3A:
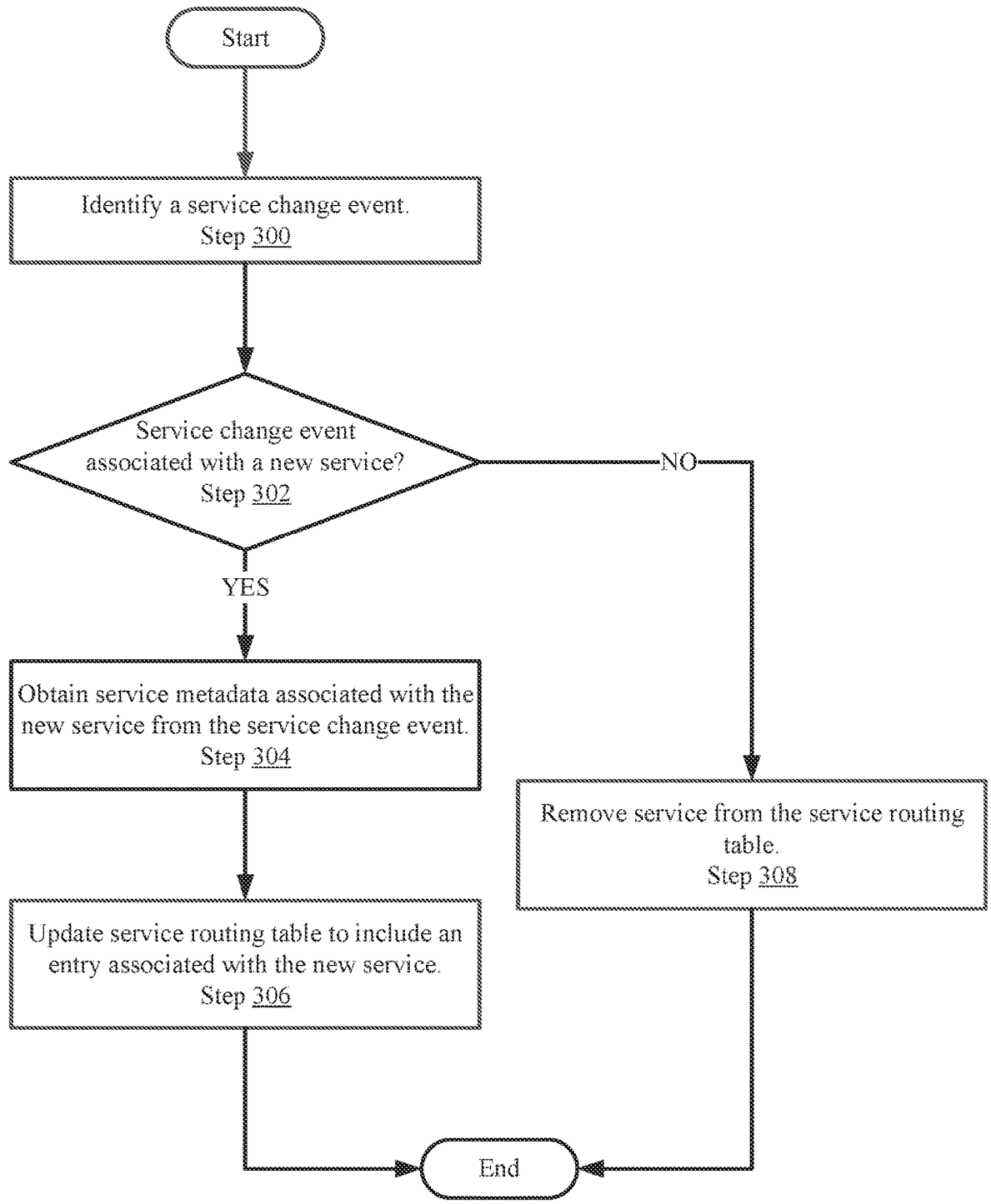
FIG. 3A shows a flowchart of a method for managing service change events in accordance with one or more embodiments of the invention.

FIG. 3A shows a flowchart of a method for managing service change events in accordance with one or more embodiments of the invention. The method may be performed by, for example, a discovery manager (102) of a data manager (100). Other components of the system illustrated in FIG. 1A may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a service change event is identified.

In one or more embodiments of the invention, the service change event is identified by obtaining a message from a service instance. The message may include a request to register with the discovery manager. The message may include a service instance identifier and information that may be used to communicate (i.e., URL address and/or port number) with the service instance. The message may include other and/or additional information without departing from the invention. The service change event may be identified via other and/or additional methods without departing from the invention.

In one or more embodiments of the invention, the discovery manager periodically send messages to the registered service instances. In response to obtaining the periodic message, a service instance may respond to the discovery manager with an affirmation message that indicates that the service instance has not failed, been corrupted, and/or otherwise removed from the data manager. The discovery manager may wait for a predetermined amount of time for a response from a service instance. When the predetermined amount of time has expired following a periodic message, the discovery manager may identify the failure of a service instance to respond within the predetermined amount of time as the service change event. The predetermined amount of time may be any amount of time without departing from the invention. The service change event may be identified via other and/or additional methods without departing from the invention.

In one or more embodiments of the invention, registered service instances send regular messages to the discovery manager. The regular messages may affirm that the service instances have not failed, been corrupted, and/or otherwise removed from the data manager. The discovery manager may monitor the time between receiving the messages associated with each service instance. The discovery manager may wait a predetermined amount of time between each regular message. When the predetermined amount of time has expired since obtaining the last regular message associated with a service instance, the discovery manager may identify the failure of a service instance to send the regular message within the predetermined amount of time as the service change event. The predetermined amount of time may be any amount of time without departing from the invention. The service change event may be identified via other and/or additional methods without departing from the invention.

In step 302, a determination is made as to whether the service change event is associated with a new service.

In one or more embodiments of the invention, the discovery manager determines whether the service change event is associated with a new service by either identifying whether the service change event is associated with a service instance registration request or a predetermined amount of time has expired before obtaining a response from a service instance. If the discovery manager identifies the service change event as a message that includes a request to register a service instance (i.e., not an expiration of a predetermined amount of time), then the discovery manager may determine that the service change event is associated with a new service. If the discovery manager identifies that the service change event is associated with a predetermined amount of time expiring (i.e., not a registration request), then the discovery manager may determine that the service change event is not associated with a new service. It may be determined whether the service change event is associated with a new service via other and/or additional methods without departing from the invention.

In one or more embodiments of the invention, if it is determined that the service change event is associated with a new service, then the method proceeds to step 304. In one or more embodiments of the invention, if it is determined that the service change event not associated with a new service, then the method proceeds to step 308.

In step 304, the service metadata associated with the new service from the service change event is obtained.

In one or more embodiments of the invention, the discovery manager sends a message to the service instance using the information included in the registration request. The message may include a request for service metadata associated with the service instance. In response to obtaining the message, the service instance may provide the service metadata to the discovery manager. The service metadata associated with the new service from the service change event may be obtained via other and/or additional methods without departing from the invention.

In step 306, the service routing table is updated to include an entry associated with the new service.

In one or more embodiments of the invention, the discovery manager updates the service routing table by generating an entry associated with the service instance. The entry may include the information associated with the service instance included in the registration request and the service metadata associated with the service instance. The discovery manager may specify the service type associated with the service instance and the service instance identifier associated with the active or standby instance of the service instance in the service routing table entry that is associated with the service instance using the service metadata obtained from the service. The entry in the service routing table may include other and/or additional information without departing from the invention. The service routing table may be updated to include an entry associated with the new service via other and/or additional means without departing from the invention.

In one or more embodiments of the invention, the method ends following step 306.

In step 308, the service is removed from the service routing table.

In one or more embodiments of the invention, the discovery manager updates the service routing table to remove the service instance from the service routing table. Removing the service instance from the service routing table may indicate that the service instance is no longer executing on the data manager, and as a result, may not be updated and may not be used to perform requests for other services and/or clients. The service may be removed from the service routing table via other and/or additional methods without departing from the invention.

In one or more embodiments of the invention, the method ends following step 308.

Figure 3B:
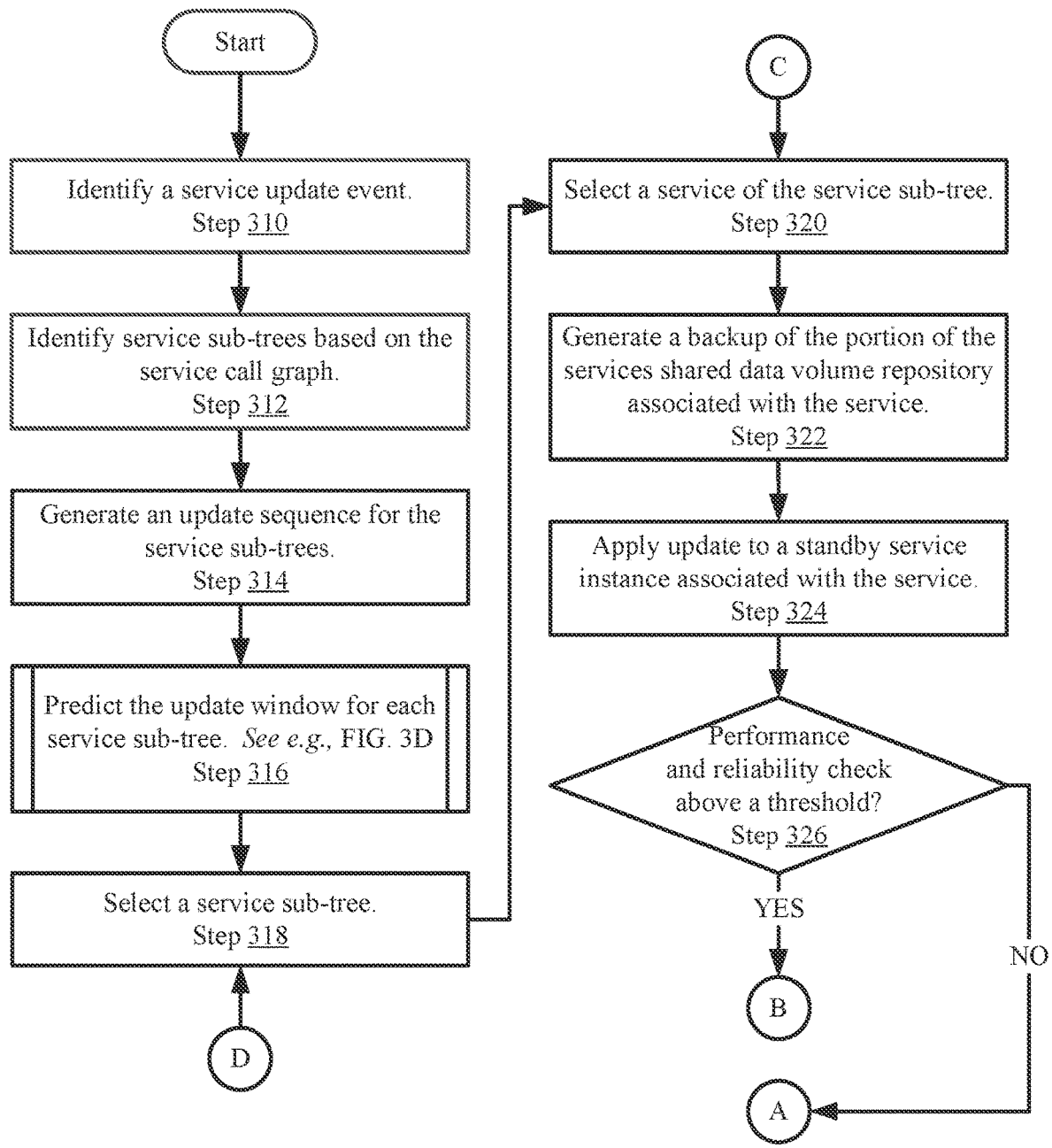
FIGS. 3B-3C show flowcharts of a method for managing updates of a data manager in accordance with one or more embodiments of the invention.
Figure 3C:
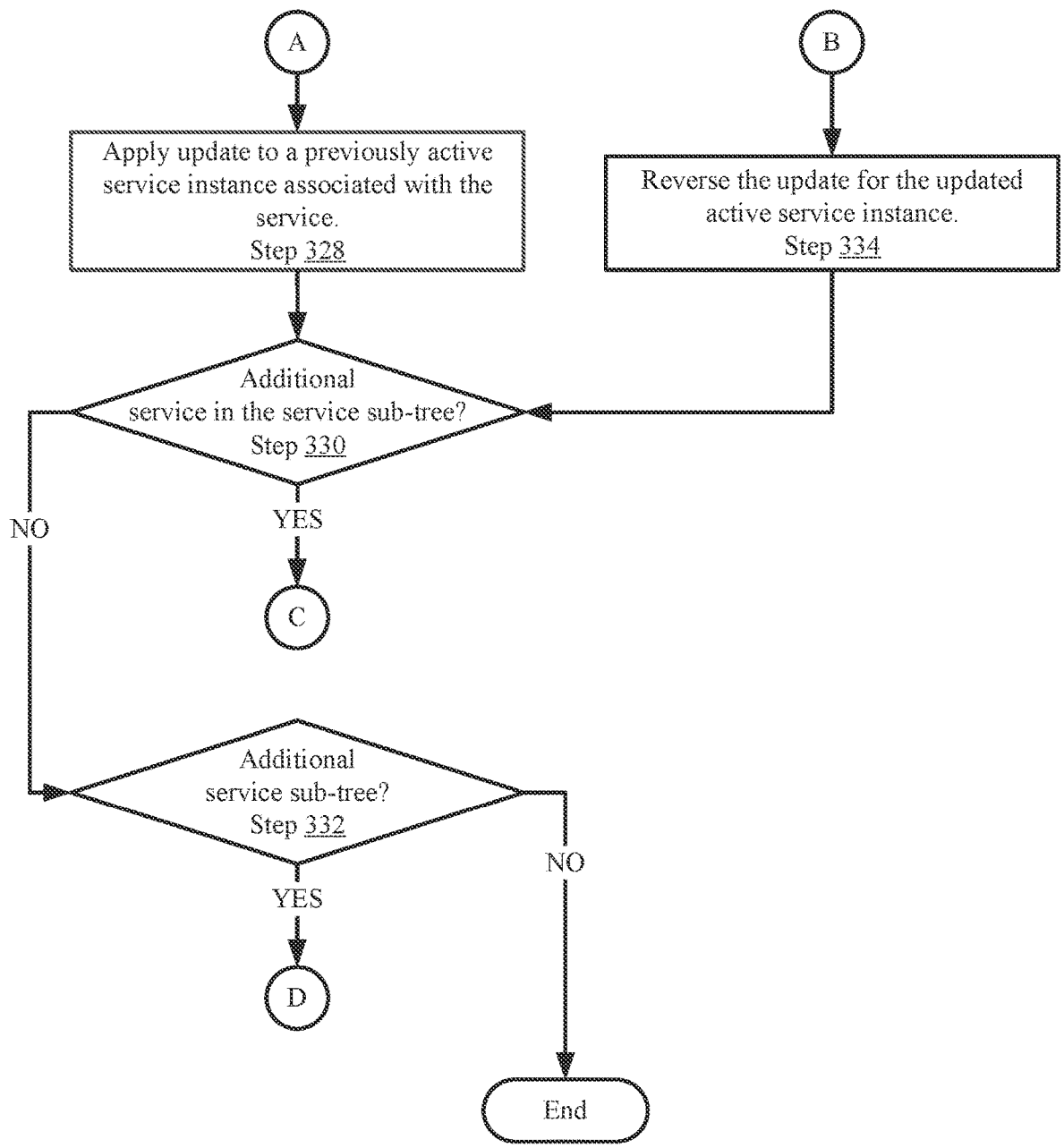

FIGS. 3B-3C show flowcharts of a method for managing updates of a data manager in accordance with one or more embodiments of the invention. The method may be performed by, for example, a distributed control manager (104) of a data manager (100). Other components of the system illustrated in FIG. 1A may perform all, or a portion, of the method of FIGS. 3B-3C without departing from the invention.

While FIGS. 3B-3C are illustrated as a series of steps, any of the steps may be omitted, performed in a different order, additional steps may be included, and/or any or all of the steps may be performed in a parallel and/or partially overlapping manner without departing from the invention.

In step 310, a service update event is identified.

In one or more embodiments of the invention, a user of the data manager or an entity that manages updates of the data manager (not shown) sends a message to the distributed control manager. The message may include a request to perform an update. The update may be associated with any number of services executing on the data manager. The message may specify the services associated with the update (i.e., include service identifiers associated with services to be updated). The message may include the updates to the services. The updates may include computer instructions, that when executed by the data manager, result in the instantiation of an updated service. The message may include other and/or additional information and/or data without departing from the invention. The distributed control manager may identify obtaining the message as the service update event. The service update event may be identified via other and/or additional methods without departing from the invention.

In step 312, service sub-trees are identified based on a service call graph.

In one or more embodiments of the invention, the distributed control manager uses the service call graph to identify service sub-trees that include the services to be updated based on the service update event. As discussed above, the service call graph specifies the hierarchical relationship of the dependencies of the services executing on the data manager. The distributed control manager may identify the services associated with the update request included in the service call graph. The distributed control manager may then identify service sub-trees using the service call graph and the identified service. The distributed control graph may identify a portion of the identified services that are uniquely dependent on or depended by only other services in the portion of the identified services as a service sub-tree. In other words, the services in a service sub-tree may share a unique dependency not found in other service sub-trees. The distributed control manager may identify any number of service sub-trees without departing from the invention. The service sub-trees may be located at any portion of the service call graph without departing from the invention. Service sub-trees may be identified based on the service call graph via other and/or additional methods without departing from the invention.

In step 314, an update sequence for the service sub-trees is generated.

In one or more embodiments of the invention, the distributed control manager identifies the update sequence for the service sub-trees based on each service sub-trees position in the service call graph. The distributed control manager may assign each service sub-tree a position in the update sequence based on the position of each service sub-tree in the service call graph. The update sequence may specify an order of service sub-trees and services included in the service sub-trees to update. The update sequence may include an ordered list of service sub-tree identifiers and an ordered list of service identifiers. The distributed control manager may assign service sub-trees located at a lower portion of the service call graph higher in the update sequence than service sub-trees located at a higher portion of the service call graph. In other words, a service sub-tree positioned at the lowest part of the service call graph may be assigned a higher update sequence position and be updated prior to a service sub-tree at a higher part of the service call graph. Each service of a service sub-tree may be updated sequentially from the top service of the service sub-tree to the bottom services of the service sub-tree based on the service call graph. The update sequence for the service sub-trees may be generated using other and/or additional methods without departing from the invention.

In step 316, the update window for each service sub-tree is predicted. In one or more embodiments of the invention, the distributed control manager uses the requests and performance metrics information repository to predict the update window for each service sub-tree. An update window is a period of time in which the number of and/or requirements for requests submitted to the services of a service sub-tree are negligible and is therefore optimal for performing updates. For additional information regarding predicting the update window for a service sub tree, refer to FIG. 3D.

In step 318, a service sub-tree is selected.

In one or more embodiments of the invention, the distributed control manager selects the highest positioned service sub-tree in the update sequence that has not been previously selected. As discussed above, the update sequence specifies an order for apply updates to the service sub-trees and the services included in the service sub-trees associated with the service update event. After selecting a service sub-tree, the distributed control manager may tag the update sequence and/or remove the service sub-tree identifier included in the update sequence to indicate that the service sub-tree has been selected so as to not select a previously selected service sub-tree. A service sub-tree may be selected via other and/or additional methods without departing from the invention.

In step 320, a service of the service sub-tree is selected.

In one or more embodiments of the invention, the distributed control manager selects the highest positioned service in the service sub-tree that has not been previously selected. After selecting a service of the service sub-tree, the distributed control manager may tag the service sub-tree and/or remove the service identifier included in the service sub-tree to indicate that the service has been selected so as to not select a previously selected service. A service may be selected via other and/or additional methods without departing from the invention.

In step 322, a backup of a portion of the services shared data volume repository associated with the service is generated.

In one or more embodiments of the invention, the distributed control manager generates a backup of the data associated with the service in the services shared data volume repository. The distributed control manager may use any backup generation techniques without departing from the invention. The distributed control manager may generate two backup copies of the data associated with the service. The distributed control manager may store the first backup copy in the services shared data volume repository for availability purposes, and may store the second backup copy in persistent storage associated with the data manager for data protection purposes. The backup copies may be used during the update and/or to restore an updated service that is not performing as expected to its previous state prior to the update. The backup of the portion of the services shared data volume repository associated with the service may be generated via other and/or additional methods without departing from the invention.

In step 324, an update is applied to a standby service instance associated with the service.

In one or more embodiments of the invention, the distributed control manager applies the update to the standby service instance associated with the service. As discussed above, each service is associated with at least one active service instance and at least one standby service instance. The active service instance may be performing requests while the standby service may not be performing requests. The distributed control manager may initiate the instantiation of the updated standby service instance using at least a portion of computer instructions included in the update request. As a result, the standby service instance may be updated. Following the update of the standby service instance, the distributed control manager may switch the active and standby status of the updated standby service instance and the active service instance in the service routing table. Accordingly, the updated standby service may be switched to an updated active service and may begin to service requests. The distributed control manager may monitor the time it takes to update the standby service instance and store that information in the requests and performance metrics information repository. The update may be applied to the standby service instance associated with the service via other and/or additional methods without departing from the invention.

In one or more embodiments of the invention, the update may be applied by the distributed control manager to each service in the service sub-tree via the methods discussed above in steps 320, 322, and 324 prior to proceeding to step 326.

In step 326, a determination is made as to whether a performance and reliability check is above a threshold.

In one or more embodiments of the invention, the distributed control manager monitors the performance of requests of the updated active service instance. The monitoring may include obtaining requests and performance metrics information associated with the updated active service instance. The monitoring of the updated active service instance may be performed for a configurable amount of time and/or requests until the performance and reliability check is performed without departing from the invention. The performance and reliability check may include comparing requests and performance metrics information following the update of the updated active service with the requests and performance metrics information of the active service instance associated with the service prior to the update.

If the comparison made during the performance and reliability check indicates that the performance of the updated active service instance is above a configurable error threshold, then the distributed control manager may determine that the performance and reliability check is above a threshold. If the comparison made during the performance and reliability check indicates that the performance of the updated active service instance is not above a configurable error threshold, then the distributed control manager may determine that the performance and reliability check is not above a threshold. The determination as to whether a performance and reliability check is above a threshold may be made via other and/or additional methods without departing from the invention.

In one or more embodiments of the invention, if it is determined that the performance and reliability check is above a threshold, then the method proceeds to step 334. In one or more embodiments of the invention, if it is determined that the performance and reliability check is not above a threshold, then the method proceeds to step 328.

In one or more embodiments of the invention, the distributed control manager may determine whether a performance and reliability check is above a threshold for all of the updated services in the service sub-tree via the methods discussed above in step 326 prior to proceeding to steps 328 or 334. If it is determined that a performance and reliability check associated with one of the services of the service sub-tree is above a threshold, then the method may proceed to step 334. If it is determined that no performance and reliability check associated with any of the services of the service sub-tree are above a threshold, then the method may proceed to step 328.

In step 328, the update is applied to a previously active service instance associated with the service.

In one or more embodiments of the invention, the distributed control manager applies the update to the standby service instance (i.e., which was previously the active service instance) associated with the service. The distributed control manager may initiate the instantiation of the updated standby service instance using at least a portion of computer instructions included in the update request. As a result, the standby service instance may be updated. The distributed control manager may monitor the time it takes to update the previously active service instance and store that information in the requests and performance metrics information repository. The update may be applied to the standby service instance (i.e., which was previously the active service instance) associated with the service via other and/or additional methods without departing from the invention.

In one or more embodiments of the invention, the update may be applied to all previously active service instances associated with all services in the service sub-tree via the methods discussed above in step 328 prior to proceeding to step 330.

In step 330, a determination is made as to whether there is an additional service in the service sub-tree.

In one or more embodiments of the invention, the distributed control manager uses the update sequence to determine whether there is an additional service in the service sub-tree. The update sequence may include a list of service identifiers associated with the services included in each service sub-tree. As discussed above, the distributed control manager may tag the update sequence and/or may remove the service identifiers associated with previously selected services of the service sub-tree to indicate which services were previously selected. If the distributed control manager identifies an identifier associated with a service of the service sub-tree included in the update sequence that is not associated with a tag, then the distributed control manager may determine that there is an additional service in the service sub-tree. If the distributed control manager does not identify an identifier associated with a service of the service sub-tree included in the update sequence that is also not associated with a tag, then the distributed control manager may determine that there is not an additional service in the service sub-tree. The determination as to whether there is an additional service in the service sub-tree may be made via other and/or additional methods without departing from the invention.

In one or more embodiments of the invention, if it is determined that there is an additional service in the service sub-tree, then the method proceeds to step 320. In one or more embodiments of the invention, if it is determined that there is not an additional service in the service sub-tree, then the method proceeds to step 332.

In step 332, a determination is made as to whether there is an additional service sub-tree.

In one or more embodiments of the invention, the distributed control manager uses the update sequence to determine whether there is an additional service sub-tree associated with the service update event. The update sequence may include a list of service sub-tree identifiers associated with each service sub-tree. As discussed above, the distributed control manager may tag the update sequence and/or may remove the service sub-tree identifiers associated with previously selected service sub-trees to indicate which service sub-trees were previously selected. If the distributed control manager identifies an identifier associated with a service sub-tree included in the update sequence that is not associated with a tag, then the distributed control manager may determine that there is an additional service sub-tree. If the distributed control manager does not identify an identifier associated with a service sub-tree included in the update sequence that is also not associated with a tag, then the distributed control manager may determine that there is not an additional service sub-tree. The determination as to whether there is an additional service in the service sub-tree may be made via other and/or additional methods without departing from the invention.

In one or more embodiments of the invention, if it is determined that there is an additional service sub-tree, then the method proceeds to step 318. In one or more embodiments of the invention, if it is determined that there is not an additional service sub-tree, then the method ends following step 332.

In step 334, the update for the updated active service instance is reversed.

In one or more embodiments of the invention, the distributed control manager reverses the update to the updated active service instance using the backup of the service generated prior to updating the active service instance. The distributed control manager may switch the active and standby status of the updated active service instance and the standby service instance. As a result the updated active service instance may be switched to the updated standby service instance and the standby service, which is has not been updated, may be switched to the active service instance. Accordingly, the active service instance may begin servicing requests. The distributed control manager may obtain one of the two backup copies associated with the service and use the backup copy to initiate the restoration of the updated standby service instance to instantiate the standby service instance to the state of the standby service instance prior to the update.

In one or more embodiments of the invention, following step 334, the method may proceed to step 330. In one or more embodiments of the invention, the update for all updated active service instances of the service sub-tree may be reversed via the methods discussed above in step 334 prior to proceeding to step 330. The distributed control manager may reverse the updates of all services in the service sub-tree to maintain compatibility between the services in the service sub-tree.

Figure 3D:
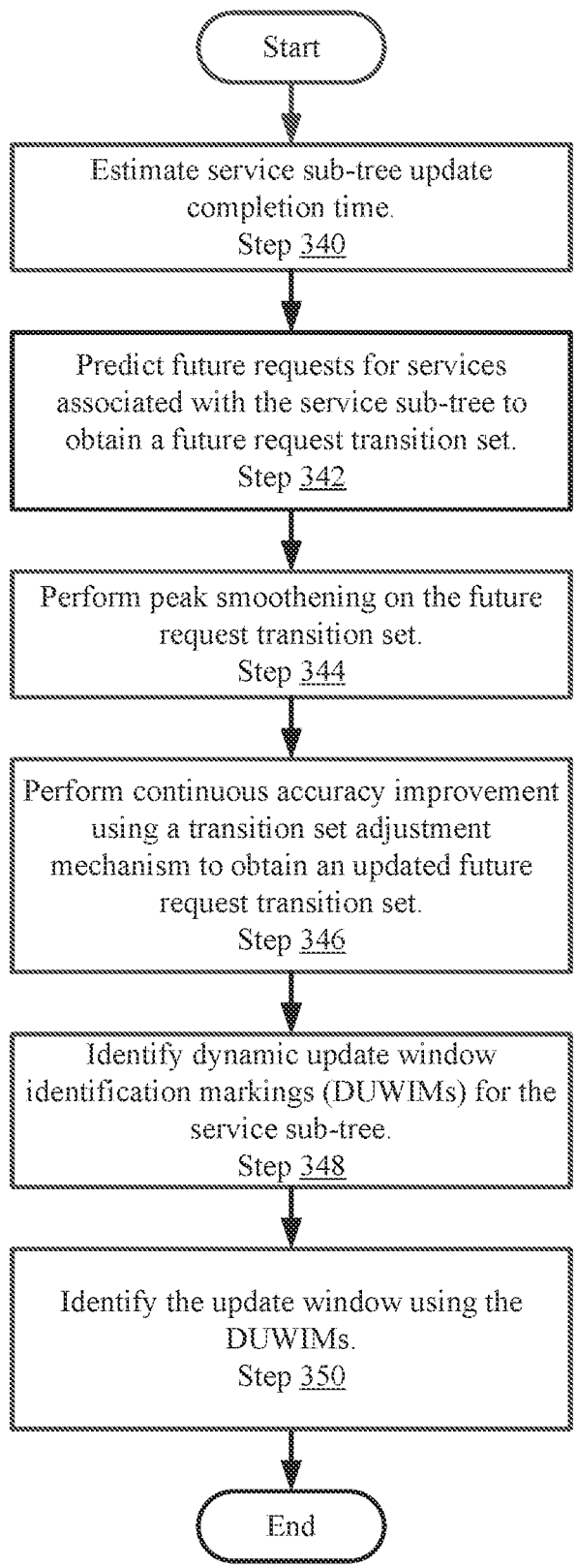
FIG. 3D shows a flowchart of a method for predicting an update window in accordance with one or more embodiments of the invention.

FIG. 3D shows a flowchart of a method for predicting an update window in accordance with one or more embodiments of the invention. The method may be performed by, for example, a distributed control manager (104) of a data manager (100). Other components of the system illustrated in FIG. 1A may perform all, or a portion, of the method of FIG. 3D without departing from the invention.

While FIG. 3D is illustrated as a series of steps, any of the steps may be omitted, performed in a different order, additional steps may be included, and/or any or all of the steps may be performed in a parallel and/or partially overlapping manner without departing from the invention.

In step 340, the service sub-tree update completion time is estimated.

In one or more embodiments of the invention, the distributed control manager uses a random forest regression algorithm to generate an estimation of the update completion time for the service sub-tree.

More specifically, the distributed control manager may obtain from the requests and performance metrics information repository the actual update completion times for previous updates associated with each service in the service sub-tree. The distributed control manager may then calculate an update completion time for each service in the service sub-tree based on the previous updated completion times of each service. The distributed control manager may then apply a random forest regression model to the update completion times to generate an estimation of the update completion time per service. The distributed control manager may apply any type of prediction model capable of generating such predictions without departing from the invention.

The distributed control manager may add a buffer window to the estimated update completion time for each service to obtain the final estimated updated completion time for each service. The buffer window may be a function of the estimated update completion time output by the random forest regression model along with a risk profile of the service.

In one embodiment of the invention, a risk profile for each of the services in the service sub-tree is determined. The risk profile may be determined as a function of the following: a count of a total number of times that an attempt was made to update the service, a count of a total number of times that an attempted update of the service failed, and a count of a total number of times that an attempted update of the service resulted in an update roll-back. The risk profile may be determined using a subset of the aforementioned counts, additional information, and/or different information without departing from the invention. The function using the aforementioned count values to determine a historical failure rate of updating of the service (e.g., failure rate=(count of a total number of times that an attempted update of the service failed+a count of a total number of times that an attempted update of the service resulted in an update roll-back)/a count of a total number of times that an attempt was made to update the service. The failure rate is then compared to one or more thresholds to determine the risk level of the service (e.g., low, medium, high). The invention is not limited to any specific granularity of risk level. Further, the risk profile for a given service may be updated periodically, each time an update is attempted to be performed on the service, and/or at any other time.

Once the risk profile for a service is determined, then the buffer window for the service is determined as follows: buffer window=f(risk level, estimated update completion time). The final estimated completion time for a service=estimated update completion time+buffer window.

The service sub-tree update completion time is then determined by aggregating the final estimated completion times for each service in the service sub-tree.

The service sub-tree update completion time may be estimated via other and/or additional methods without departing from the invention.

In step 342, the future requests for services associated with the service sub-tree are predicted to obtain a future request density transition set.

In one or more embodiments of the invention, the distributed control manager uses the requests and performance metrics information associated with requests serviced by the services of the service sub-tree included in the requests and performance metrics information repository to obtain the future requests transition set. The distributed control manager may use the requests and performance metrics information to generate time series data. The time series data may include requests and performance metrics information that are associated with points in time. The distributed control manager may classify the time series data based on request types (e.g., read requests, writes requests) and where the requests originated from (i.e., internal requests from other services of the data manager or external requests from other entities such as the clients) to determine which request may be allowed and/or restricted during the performance of the update. In addition to the requests and performance metrics information associated with past requests serviced by the services of the service sub-tree, the times series data may also include the utilization information included in the requests and performance metrics information repository associated with hardware components of the data manager.

The distributed control manager may apply the time series data to a probabilistic weighted fuzzy times series model to obtain the prediction of the future request density transition set for each service in the service sub-tree. The distributed control manager may apply any other prediction model capable of generating predictions of the number of future requests for each service without departing from the invention. The future requests transition set may include predictions for the number of requests sent to each service at future points in time. The future requests transition set may also include predictions of future utilization information at future points in time. The future requests transitions set may be associated with a configurable number of future points in time. The future requests for services associated with the service sub-tree may be predicted to obtain a future request density transition set via other and/or additional methods without departing from the invention.

In step 344, peak smoothening is performed on the future requests transition set.

In one or more embodiments of the invention, the distributed control manager may perform peak smoothing on the future requests transition set to obtain a smoothed updated future requests transition set. The future requests transitions sets may include points in time associated with a number of requests and/or utilization information that is significantly higher than that of the previous point in time and the subsequent point in time. The distributed control manager may identify these points in time as peaks. If the peaks (i.e., the number of requests and/or utilization information) are above a configurable percentage of the neighboring points in time, the distributed control manager may remove the peaks from the future requests transition set to smooth the future requests transition set to stabilize the future requests transition set. Peak smoothening may be performed on the future requests transition set via other and/or additional methods without departing from the invention.

In step 346, continuous accuracy improvement is performed on the future request density transition set to obtain an updated future request density transition set.

In one or more embodiments of the invention, the distributed control manager performs continuous accuracy improvement on the future request density transition set using the real time monitoring updates of the requests and performance metrics information repository. The distributed control manager may compare the future request density transition set to the number of requests services for the services of the service sub-tree included in the requests and performance metrics information repository for a portion of the future points in time included in the future requests transition set as they occur in real time. If the predicted values and the real monitored values are different by a configurable percentage, the distributed control manager may update the future requests transition set. Continuous accuracy improvement may be performed on the future request density transition set to obtain an updated future request density transition set via other and/or additional methods without departing from the invention.

In step 348, dynamic update window identification markings (DUWIMs) for the service sub-tree are identified.

In one or more embodiments of the invention, the distributed control manager uses the updated future request density transition set to identify DUWIMs for the service sub-tree. The distributed control manager may divide the future requests transition set into periods of time spanning the entirety of the future requests transition set. The distributed control manager may divide the future requests set into any number of periods of time of any length in time without departing from the invention. For each period of time, the distributed control manager may determine whether the request density for each service is associated with a high usage, a medium usage, and/or a low usage. The request density may refer to the number of requests per service of the service sub-tree. Low usage may refer to a request density between zero and ten percent, medium usage may refer to a request density between ten and fifty percent, and high usage may refer to a request density between fifty and one hundred percent.

The distributed control manager may use a different level of granularity of levels of use and divisions of requests density associated with each level of use without departing from the invention. The distributed control manager may assign a DUWIM of 1 to all time periods associated with a low usage, and may assign a DUWIM of 0 to all time periods associated with a medium or high usage. The distributed control manager may update the DUWIMs based on the continuous accuracy improvements made over time in step 346. The DUWIMs may be identified for the service sub-tree via other and/or additional methods without departing from the invention.

In step 350, the update window is identified using the DUWIMs.

In one or more embodiments of the invention, the distributed control manager uses the DUWIMs and the estimated service sub-tree completion time to identify the update window. The distributed control manager may identify consecutive periods of time associated with DUWIMs of 1 that coincide with a greater or equal amount of time than the estimated service sub-tree completion time as the update window. The update window may be identified using the DUWIMs via other and/or additional methods without departing from the invention.

The method may end following step 350.

To further clarify embodiments of the invention, a non-limiting example is provided in FIGS. 4A-4E. FIGS. 4A-4E show diagrams of operations of an example system over time. FIGS. 4A-4E may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIGS. 4A-4E.

Example

Figure 4A:
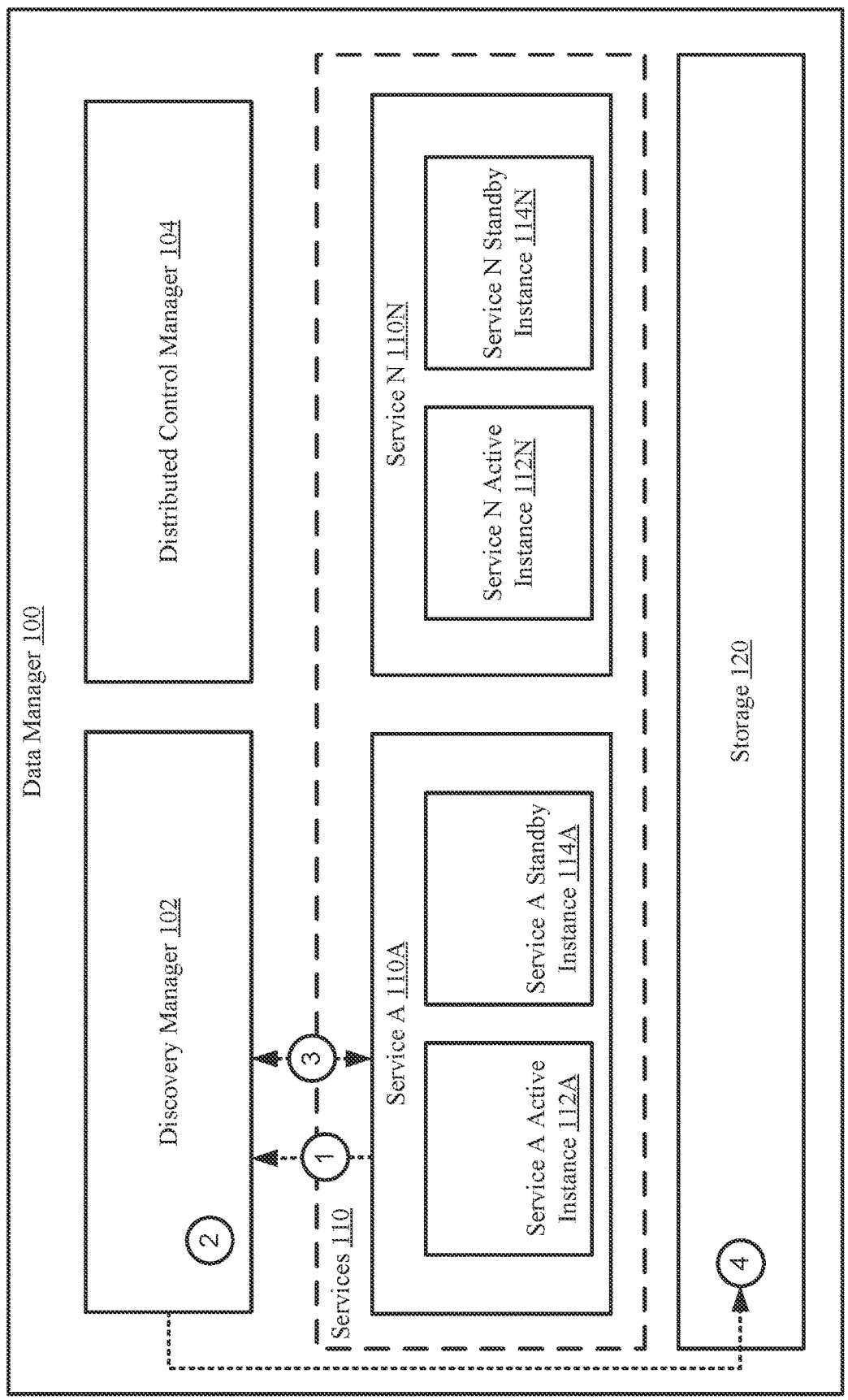
FIGS. 4A-4E show diagrams of the operation of an example system over time in accordance with one or more embodiments of the invention.

Turning to FIG. 4A, consider a scenario in which service A (110A) registers with a discovery manager (102) of a data manager (100). At step 1, service A (110A) sends a discovery request to the discovery manager (102). The discovery manager (102) identifies obtaining the registration request as a service change event. In response to obtaining the registration request, at step 2, the discovery manager (102) makes a determination that the service change event is associated with a new service. Next, at step 3, the discovery manager (102) obtains service metadata associated with service A (110A). The service metadata specifies that service A (110A) includes a service A active instance (112A) and a service A standby instance (114A). The service metadata includes other information regarding service A (110A) such as, for example, access information including and IP address and a port number that may be used to access service A (110A). After obtaining the service metadata associated with service A (110A) the discovery manager updates a service routing table in the storage (120) to include the service metadata associated with service A (110A).

Figure 4B:
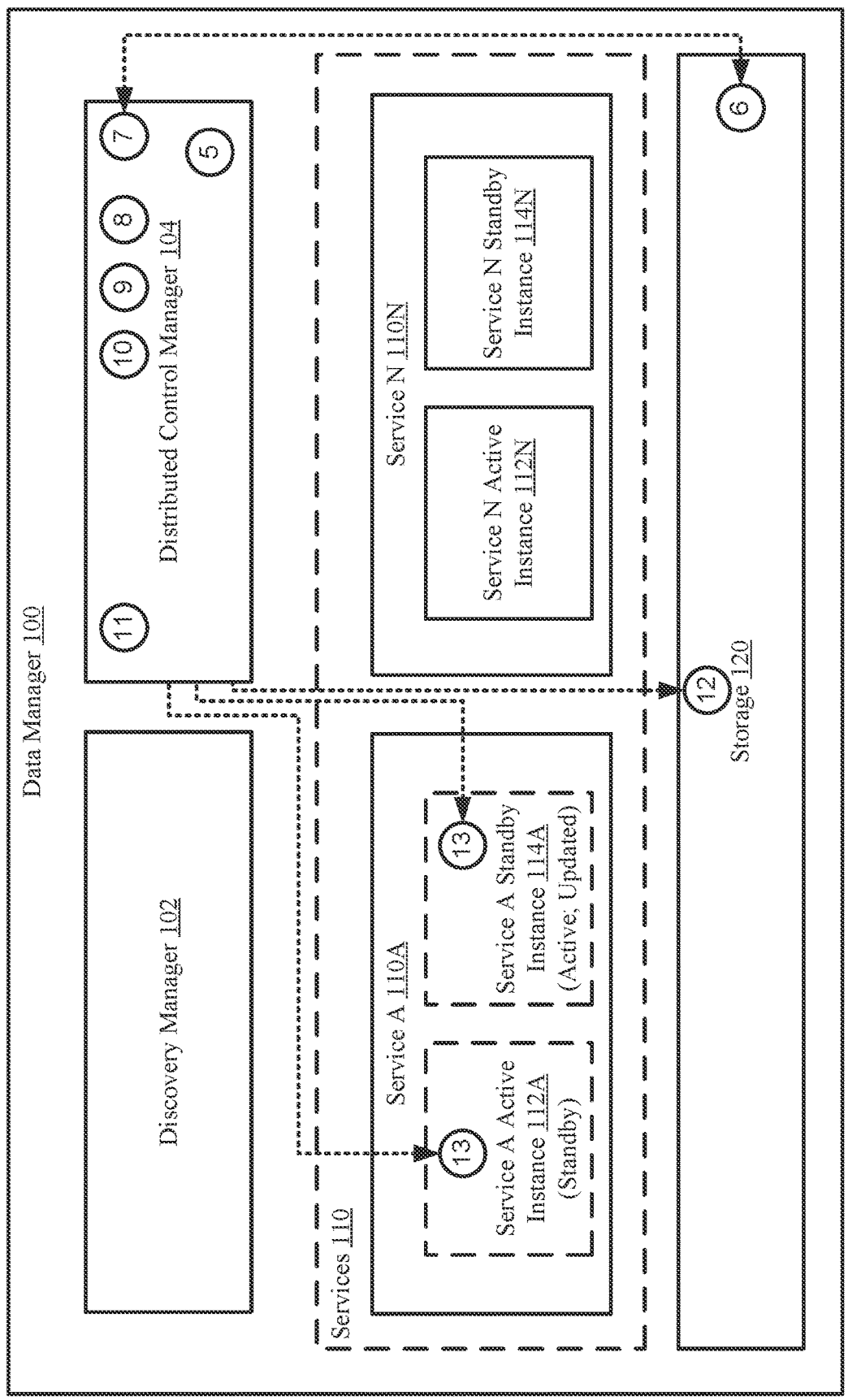

Turning to FIG. 4B, at some point in time after updating the service routing table, at step 5, a distributed control manager (104) of the data manager (100) identifies an update event. In response to identifying the update event, at step 6, the distributed control manager (104) obtains a service call graph (104) from the storage (120). At step 7, the distributed control manager (104) identifies a service sub-tree associated with the update event using the service call graph. The service sub-tree includes two services of data manager (100), service A (110A) and service N (110N). At step 8, the distributed control manager (104) generates an update sequence for the service sub-tree using the service call graph. The update sequence specifies that service A (110A) is to be updated first and service N (110N) is to be updated second.

At step 9, the distributed control manager (104) predicts the update window for the service sub-tree. The update window specifies a period of time in which service A (110A) and service N (110N) receive a minimal amount of requests to perform.

In this example, assume that Service A has a risk profile which indicates it is high risk and Service B has a risk profile that indicates it is low risk. Further, assume that the buffer window for a given service is determined as follows: f(risk level, estimated update completion time), where when risk level=High, buffer window=3* estimated update completion time, when risk level=Medium, buffer window=1.5* estimated update completion time, and when risk level=low, buffer window=0* estimated update completion time.

Continuing with the example, assume that the estimated update completion time for Service A is 20 minutes, then the buffer window is 60 minutes (i.e., 3*20 minutes). Accordingly, the final estimated update completion time for Service A is 80 minutes. Further, assume that the estimated update completion time for Service B is 10 minutes, then the buffer window is 0 minutes (i.e., O*10 minutes). Accordingly, the final estimated update completion time for Service is 10 minutes.

Based on the above final estimated update completion times for Services A and B, the estimated service sub-tree update completion time is 90 minutes (i.e., 80+10). The estimated service sub-tree update completion time is then used to identify the update window for the sub-tree in accordance with the method shown in FIG. 3D.

Continuing with the example, when the update window begins, at step 10, the distributed control manager (104) selects the service sub-tree. At step 11, the distributed control manager (104) selects service A (110A) of the service sub-tree. At step 12, the distributed control manager (104) backs up the data associated with service A (110A) in the services shared data volume of the storage (120). At step 13, the distributed control manager (104) applies the update to the service A standby instance (114A) and then switches the service A standby instance (114A) to an active instance and the service A active instance (112A) to a standby instance.

Figure 4C:
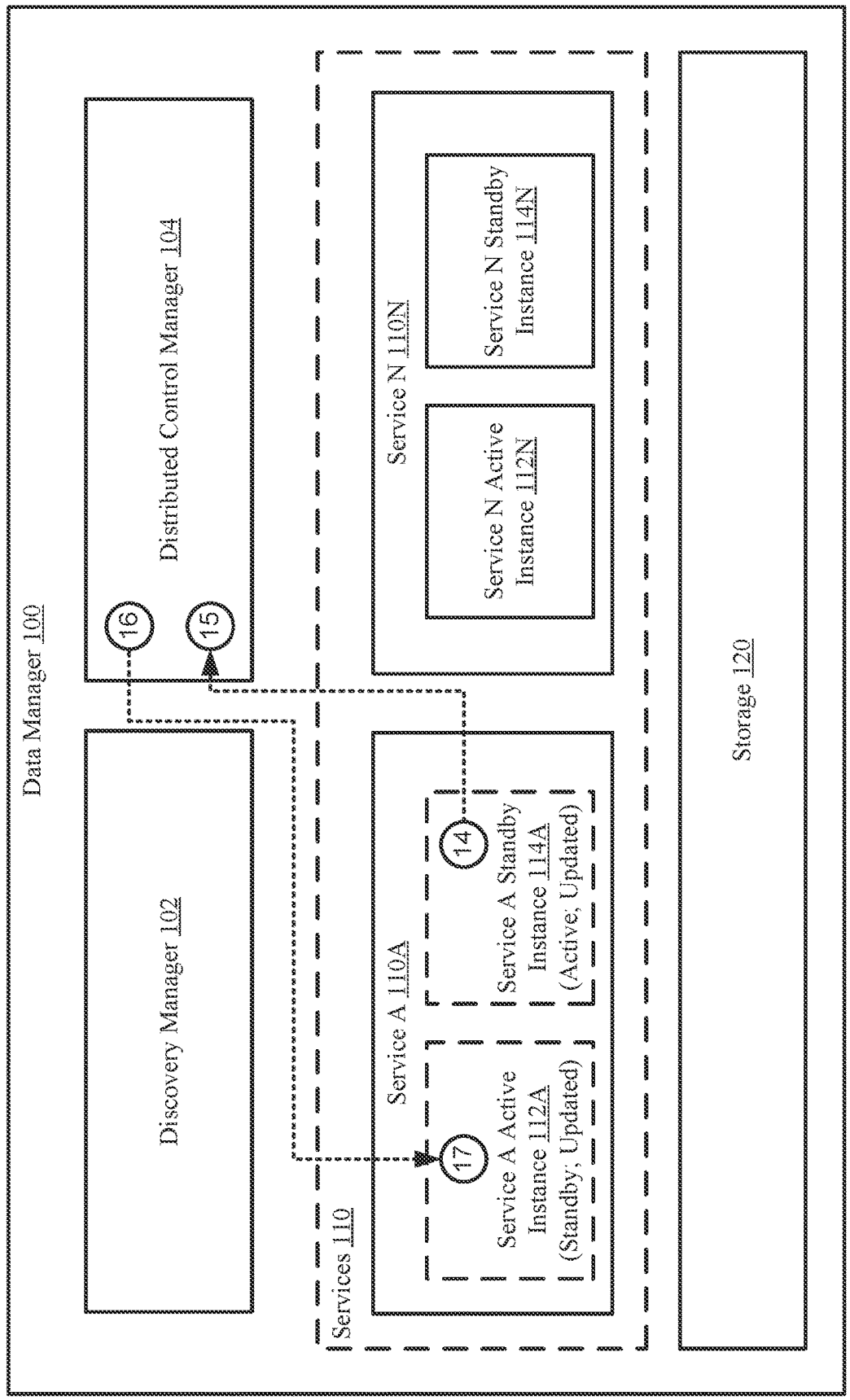

Turning to FIG. 4C, at step 14, the service A standby instance (114A), which is now an active instance and is updated, performs requests for a period of time. At step 15, the distributed control manager (104) obtains requests and performance metrics information associated with the aforementioned performance of the requests. At step 16, the distributed control manager (104) performs a performance and reliability check using the obtained requests and performance metrics information and determines that the service A standby instance (114A), which is now an active instance and is updated, is performing at an optimal level. Based on the determination, at step 17, the distributed control manager (104) finishes the update of service A (110A) by updating the service A active instance (112A), which is now a standby instance.

Figure 4D:
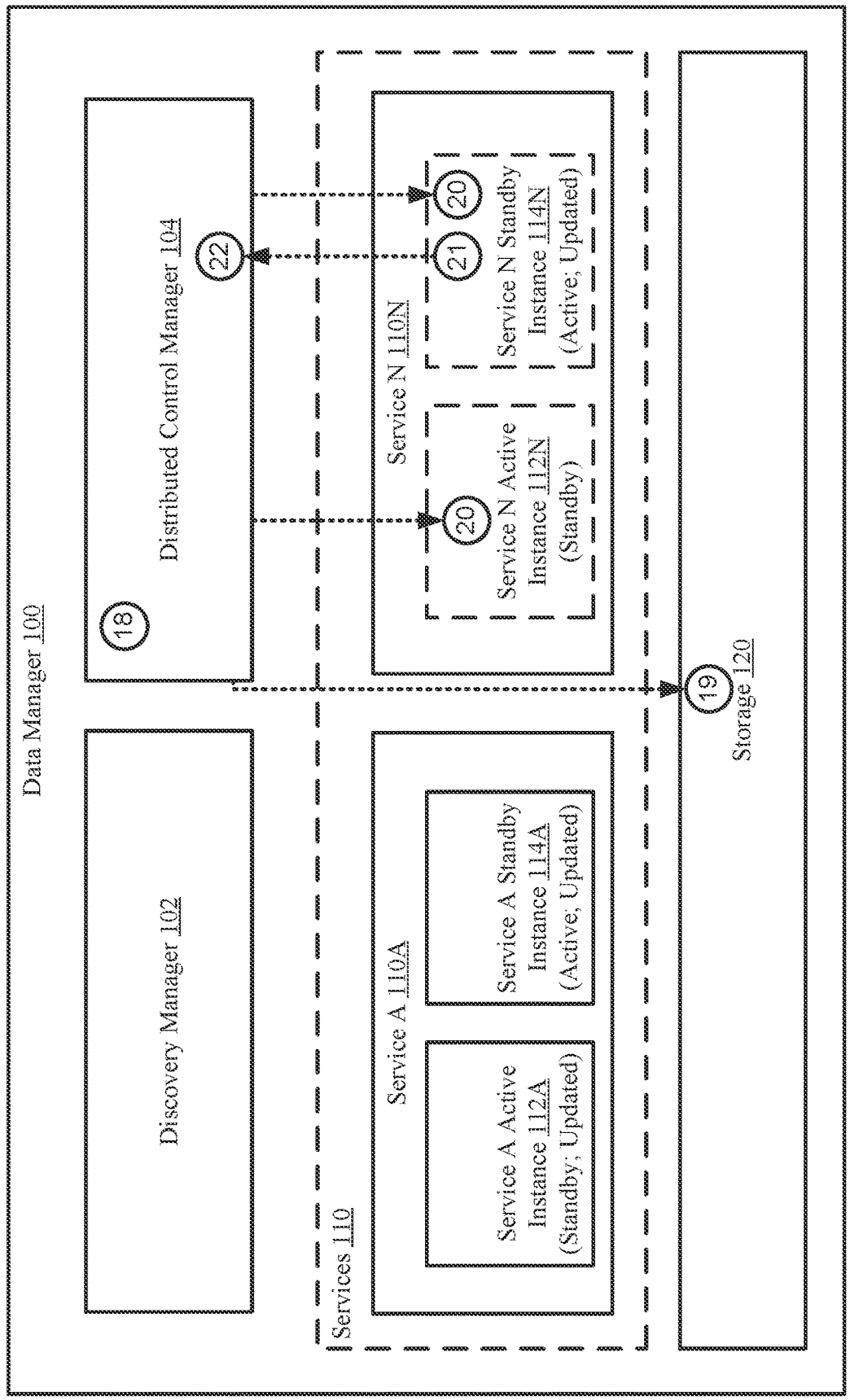

Turning to FIG. 4D, at step 18, the distributed control manager (104) selects service N (110N) of the service sub-tree. At step 19, the distributed control manager (104) backs up the data associated with service N (110N) in the services shared data volume of the storage (120). At step 20, the distributed control manager (104) applies the update to the service N standby instance (114N) and then switches the service N standby instance (114N) to an active instance and the service N active instance (112N) to a standby instance. At step 21, the service N standby instance (114N), which is now an active instance and is updated, performs requests for a period of time. At step 22, the distributed control manager (104) obtains requests and performance metrics information associated with the aforementioned performance of the requests.

Figure 4E:
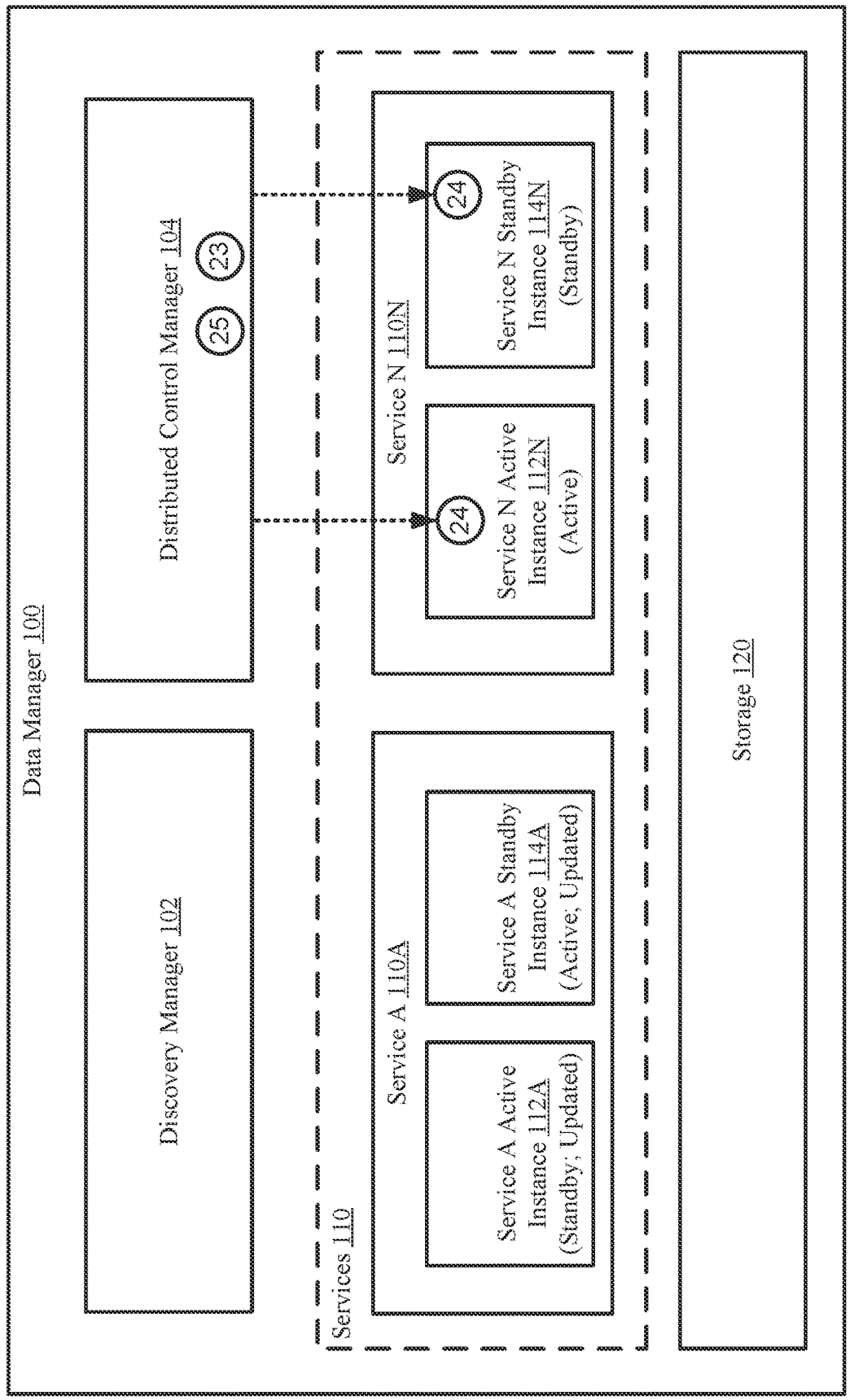

Turning to FIG. 4E, at step 23, the distributed control manager (104) performs a performance and reliability check using the obtained requests and performance metrics information and determines that the service N standby instance (114N), which is now an active instance and is updated, is not performing at an optimal level. Based on the determination, at step 24, the distributed control manager (104) switches the service N active instance (112N) back to an active instance and the switches service N standby instance (114N), which is now updated, back to a standby instance. Furthermore, the distributed control manager reverts the service N standby instance (114N) back to its original version. At step 25, the distributed control manager (104) determines there are no more services included in the service sub-tree.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the performance of updates for a data manager. More specifically, embodiments of the invention relate to updating services in a manner that minimizes the downtime of the data manager and that takes into account the risk profiles of the services being updated. In traditional systems, the a data manager may have to go offline in order to perform an update, which may result in a period of unavailability thereby resulting a delay in the performance of critical management services by the data manager. Embodiments of the invention improve the efficiency of updating a data manager. As discussed above, embodiments of the invention relate to updating the services of the data manager in a way in which the data manager remains available during the update to perform the critical management services.

Thus, embodiments of the invention may address the problem of inefficient use of computing resources to perform updates of a data manager in a system. This problem arises due to the technological nature of the environment in which the data manager operates.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing updates of a data manager, the method comprising:
- identifying, by a distributed control manager of the data manager, a service update event, wherein the data manager comprises services;
- in response to identifying the service update event:
  - identifying a service sub-tree based on a service call graph;
  - generating an update sequence for the service sub-tree using the service call graph;
  - predicting an update window for the service sub-tree based on a risk profile for a service specified in the service sub-tree;
  - selecting a first service of the service sub-tree based on the update sequence, wherein the first service comprises a first standby service instance and a first active service instance;
  - generating a backup of a first portion of a services shared data volume repository associated with the first service;
  - applying a first portion of an update to the first standby service instance to obtain a first updated active service instance;
  - making a first determination that a first performance and reliability check associated with the first updated active service instance is below a threshold; and
  - in response to the first determination:
    - applying the first portion of the update to a second standby service instance, wherein the second standby service instance comprises the first active service instance.

2. The method of claim 1, wherein predicting the update window for the service sub-tree comprises:
- predicting service sub-tree update completion time using a final estimated updated completion time for the service, wherein the final estimated updated completion time is based on the risk profile;
- predicting future requests for services associated with the service sub-tree to obtain a future request density transition set;
- performing peak smoothening on the future request density transition set;
- performing continuous accuracy improvement to obtain an updated future request density transition set;
- identifying dynamic update window identification markings (DUWIMs) for the service sub-tree based on the updated future request density transition set; and
- identifying the update window using the DUWIMs.

3. The method of claim 2, wherein the final estimated updated completion time is a function of an estimated update completion time for the service and a buffer window.

4. The method of claim 3, wherein the buffer window is a function of a risk level specified in the risk profile for the service and the estimated update completion time for the service.

5. The method of claim 4, wherein the risk level for the service is based on a count of a total number of times that an attempt was made to update the service, a count of a total number of times that an attempted update of the service failed, and a count of a total number of times that an attempted update of the service resulted in an update rollback.

6. The method of claim 1, wherein the risk profile for the service is based on a count of a total number of times that an attempt was made to update the service, a count of a total number of times that an attempted update of the service failed, and a count of a total number of times that an attempted update of the service resulted in an update rollback.

7. The method of claim 1, the method further comprising:
- after applying the first portion of the update to the second standby service instance:
  - selecting a second service of the service sub-tree based on the update sequence, wherein the second service comprises a third standby service instance and a second active service instance;
  - generating a backup of a second portion of a services shared data volume repository associated with the second service;
  - applying a second portion of an update to the third standby service instance to obtain a second updated active service instance;
  - making a second determination that a second performance and reliability check associated with the second updated active service instance is above a threshold; and
  - in response to the second determination:
    - reversing the second portion of the update to the second updated active service instance to obtain the third standby service instance.

8. A non-transitory computer readable medium comprising computer readable program code, which when executed by a computer processor enables the computer processor to perform a method for managing updates of a data manager, the method comprising:
- identifying, by a distributed control manager of the data manager, a service update event, wherein the data manager comprises services;
- in response to identifying the service update event:
  - identifying a service sub-tree based on a service call graph;
  - generating an update sequence for the service sub-tree using the service call graph;
  - predicting an update window for the service sub-tree based on a risk profile for a service specified in the service sub-tree;
  - selecting a first service of the service sub-tree based on the update sequence, wherein the first service comprises a first standby service instance and a first active service instance;
  - generating a backup of a first portion of a services shared data volume repository associated with the first service;
  - applying a first portion of an update to the first standby service instance to obtain a first updated active service instance;
  - making a first determination that a first performance and reliability check associated with the first updated active service instance is below a threshold; and
  - in response to the first determination:
    - applying the first portion of the update to a second standby service instance, wherein the second standby service instance comprises the first active service instance.

9. The non-transitory computer readable medium of claim 8, wherein predicting the update window for the service sub-tree comprises:
- predicting service sub-tree update completion time using a final estimated updated completion time for the service, wherein the final estimated updated completion time is based on the risk profile;
predicting future requests for services associated with the service sub-tree to obtain a future request density transition set;
performing peak smoothening on the future request density transition set;
performing continuous accuracy improvement to obtain an updated future request density transition set;
identifying dynamic update window identification markings (DUWIMs) for the service sub-tree based on the updated future request density transition set; and
identifying the update window using the DUWIMs.

10. The non-transitory computer readable medium of claim 9, wherein the final estimated updated completion time is a function of an estimated update completion time for the service and a buffer window.

11. The non-transitory computer readable medium of claim 10, wherein the buffer window is a function of a risk level specified in the risk profile for the service and the estimated update completion time for the service.

12. The non-transitory computer readable medium of claim 11, wherein the risk level for the service is based on a count of a total number of times that an attempt was made to update the service, a count of a total number of times that an attempted update of the service failed, and a count of a total number of times that an attempted update of the service resulted in an update roll-back.

13. The non-transitory computer readable medium of claim 8, wherein the risk profile for the service is based on a count of a total number of times that an attempt was made to update the service, a count of a total number of times that an attempted update of the service failed, and a count of a total number of times that an attempted update of the service resulted in an update roll-back.

14. The non-transitory computer readable medium of claim 8, the method further comprising:
after applying the first portion of the update to the second standby service instance:
selecting a second service of the service sub-tree based on the update sequence, wherein the second service comprises a third standby service instance and a second active service instance;
generating a backup of a second portion of a services shared data volume repository associated with the second service;
applying a second portion of an update to the third standby service instance to obtain a second updated active service instance;
making a second determination that a second performance and reliability check associated with the second updated active service instance is above a threshold; and
in response to the second determination:
reversing the second portion of the update to the second updated active service instance to obtain the third standby service instance.

15. A system for managing updates of a data manager, the system comprising:
the data manager comprising services;
a distributed control manager of the data manager, comprising a processor and memory, configured to:
identify a service update event, wherein the data manager comprises services;
in response to identifying the service update event:
identifying a service sub-tree based on a service call graph;
generating an update sequence for the service sub-tree using the service call graph;
predicting an update window for the service sub-tree based on a risk profile for a service specified in the service sub-tree;
selecting a first service of the service sub-tree based on the update sequence, wherein the first service comprises a first standby service instance and a first active service instance;
generating a backup of a first portion of a services shared data volume repository associated with the first service;
applying a first portion of an update to the first standby service instance to obtain a first updated active service instance;
making a first determination that a first performance and reliability check associated with the first updated active service instance is below a threshold; and
in response to the first determination:
applying the first portion of the update to a second standby service instance, wherein the second standby service instance comprises the first active service instance.

16. The system of claim 15, wherein predicting the update window for the service sub-tree comprises:
predicting service sub-tree update completion time using a final estimated updated completion time for the service, wherein the final estimated updated completion time is based on the risk profile;
predicting future requests for services associated with the service sub-tree to obtain a future request density transition set;
performing peak smoothening on the future request density transition set;
performing continuous accuracy improvement to obtain an updated future request density transition set;
identifying dynamic update window identification markings (DUWIMs) for the service sub-tree based on the updated future request density transition set; and
identifying the update window using the DUWIMs.

17. The system of claim 16, wherein the final estimated updated completion time is a function of an estimated update completion time for the service and a buffer window.

18. The system of claim 17, wherein the buffer window is a function of a risk level specified in the risk profile for the service and the estimated update completion time for the service.

19. The system of claim 18, wherein the risk level for the service is based on a count of a total number of times that an attempt was made to update the service, a count of a total number of times that an attempted update of the service failed, and a count of a total number of times that an attempted update of the service resulted in an update roll-back.

20. The system of claim 15, wherein the risk profile for the service is based on a count of a total number of times that an attempt was made to update the service, a count of a total number of times that an attempted update of the service failed, and a count of a total number of times that an attempted update of the service resulted in an update roll-back.

* * * * *